ns Patent [19]

Shimogawa et al.

[11] 4,087,118
[45] May 2, 1978

[54] SAFETY SEAT BELT SYSTEM

[75] Inventors: Toshiaki Shimogawa, Nishio; Kameo Uchiyamada, Okazaki; Masayuki Morita, Tokoname, all of Japan

[73] Assignee: Nippon Soken, Inc., Nishio, Japan

[21] Appl. No.: 712,873

[22] Filed: Aug. 9, 1976

[30] Foreign Application Priority Data

Aug. 29, 1975 Japan .................................. 50-105246

[51] Int. Cl.² ............................................ B60R 21/10
[52] U.S. Cl. .................................................. 280/745
[58] Field of Search ....................... 280/744, 745, 747; 297/388, 389

[56] References Cited

U.S. PATENT DOCUMENTS

| 3,414,291 | 12/1968 | Jantzen | 280/744 |
| 3,865,397 | 2/1974 | Pilhall | 280/745 |
| 3,985,193 | 10/1976 | Akiyama | 280/745 |

Primary Examiner—Robert R. Song
Attorney, Agent, or Firm—Cushman, Darby & Cushman

[57] ABSTRACT

A safety seat belt system is disclosed wherein a belt which is slidably inserted through a through tongue has its one end securely anchored to a lower portion of a door of an automotive vehicle adjacent the free swinging edge thereof and the other end securely fixed to a first retractor anchored to an upper portion of a structural member such as a center pillar of the compartment, and an inner belt has its one end securely fixed to the through tongue and the other end securely fixed to a second retractor securely anchored to a lower inboard portion on the side of a seat remote from the door in the compartment in such a way that when an occupant fastens the belt almost all the length of the inner belt is kept retracted into the second retractor to hold the through tongue in a predetermined position adjacent to the side of the seat remote from the door and consequently the lower section of the belt is extended across the lap of the occupant between the door and the through tongue while the upper section of the belt slantly upwardly extends across the shoulder of the occupant from the tongue to the first retractor. To release the belt, the occupant grips the through tongue to extend the inner belt out of the second retractor and engages the tongue with a hook securely anchored to an upper portion of a front pillar of the compartment adjacent the hinged edge of the door.

3 Claims, 2 Drawing Figures

SAFETY SEAT BELT SYSTEM

BACKGROUND OF THE INVENTION

The present invention relates generally to a safety seat belt system for use in an automotive vehicle and more particularly to an improvement thereof for easy ingress and egress to and from a seat.

In general, the prior art three-point safety seat belt consists of an inner belt, a shoulder belt, a lap belt and a buckle and tongue coupling. Fastening this safety seat belt consists of two steps, in the first step an occupant grips the tongue and in the next step he inserts it into the buckle for engagement therewith. Even when the safety seat belt is not fastened, it does not blind the occupant's front view and it does not restrict the free space for an occupant. In other words, a driver may drive his car irrespective of whether he fastens the safety seat belt or not.

Therefore even when the safety seat belt is installed, it has not been fully used for its intended purpose because an occupant forgets to fasten the safety seat belt or he does not want to fasten it.

The present invention was made to overcome the above problem, and has for its object to provide a safety belt system which may be readily fastened and which must be fastened once an occupant, especially a driver, sits on the seat.

Another object of the present invention is to provide a safety belt system in which an inner belt is made of a material having a high tensile strength but a very small elongation percentage for restricting the extension of the inner belt to the minimum in case of a collision, thereby preventing a secondary collision of an occupant in the compartment.

A further object of the present invention is to provide a safety belt system in which an inner belt is made of a spring material for coiled or helical springs which exhibits the positive spring characteristics so that the self-winding tendency of the inner belt may be advantageously utilized together with the winding force of an inner belt retractor and consequently the positive, reliable and dependable rewinding of the inner belt may be ensured.

The present invention will become more apparent from the following description of one preferred embodiment thereof taken in conjunction with the accompanying drawing.

DESCRIPTION OF THE PREFERRED EMBODIMENT

Figure 1:
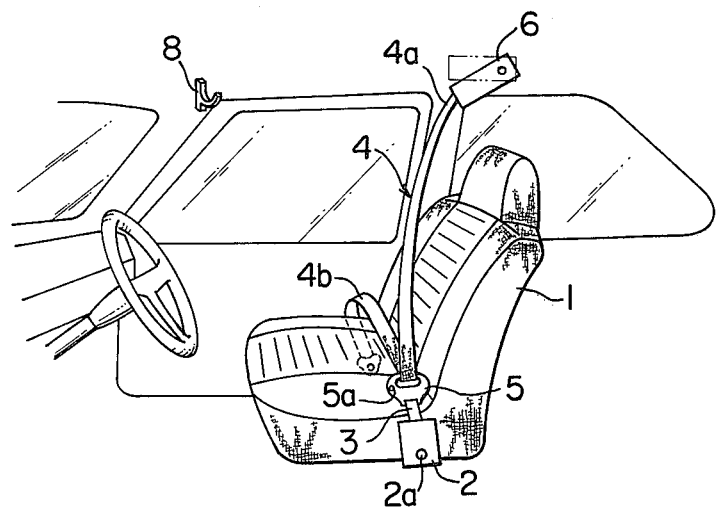
FIG. 1 is a view illustrating a safety seat belt system in accordance with the present invention in the occupant restrain position.
Figure 2:
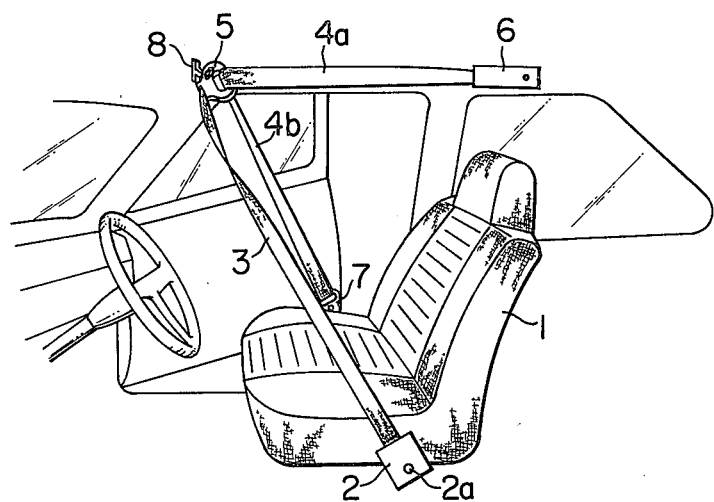
FIG. 2 illustrates the safety seat belt in the released position.

Referring to FIGS. 1 and 2, a second retractor 2 is swingably pivoted by a pivot pin 2a to a lower inboard portion of a seat 1. The second retractor 2 is adapted to retract or wind an inner belt 3 under the force of a spring, and includes an emergency locking device for locking a spring-loaded reel to prevent the unwinding of the inner belt 3. The inner belt 3 is made of a material having a high tensile strength but a very small elongation percentage such as steel belt coated with resin or steel wire. One end of the inner belt 3 is securely fixed to the second retractor 2 in the manner described above while the other end is securely fixed to a through tongue 5. Since the inner belt 3 is made of a material having a high tensible strength but a very small elongation percentage, when the spring-loaded reel of the retractor 2 is locked in case of an emergency, the occupant restraining load exerted to the inner belt 3 prevents the extension of the inner belt 3 so as to securely restrain the occupant.

A belt 4 constitutes the so-called continuous webbing type three-point safety belt, and is inserted through the through tongue 5 to be folded back to define a shoulder belt section 4a and a lap belt section 4b. One end of the belt 4 is securely fixed to an upper portion of a center pillar or to a first retractor 6 pivotably fixed thereto while the other end is securely fixed to a lower portion of the door adjacent to the free swinging edge thereof with an anchor 7.

The through tongue 5 is formed of a relatively thick steel strip by the press, and then is plated. It is provided with an engaging hole 5a for engagement with a hook member 8.

The first retractor 6 is adapted to releasably wind the shoulder belt section 4a of the belt 4 under the force of a spring, and includes an emergency locking device. As described above, the shoulder belt section 4a is extended from the through tongue 5 upwardly transversely of the seat 1 for restraining the shoulder of the occupant. The belt winding force of the first retractor 6 is selected weaker than the inner belt winding force of the second retractor 2. Therefore when the belt 4 is restraining the occupant as shown in FIG. 1, the inner belt 3 is completely wound in the second retractor 2 in such a way that the through tongue 5 may be located at a predetermined position. The tension or restraining force of the belt 4, which gives the occupant the feeling of being stressed or oppressed, can be suitably adjusted as the occupant demands by the first retractor 6 independently of the second retractor 2. In addition, the adjustment of the length of the unwound belt 4 can be also adjusted by the first retractor 6 depending upon the physical figure of the occupant and the longitudinal position of the seat 1.

The hook member 8, which is fabricated by bending a steel rod, is securely fixed to a reinforcing member mounted on the upper side of a front pillar on the side of the right door. In like manner, a hook member for the safety belt for the occupant on the left-side front seat is securely fixed to a reinforcing member mounted on the upper side of a front pillar on the side of the left door. That is, the safety belt installations for the occupants on the front seats are symmetrical about the centerline of the vehicle. The hook member 8 is adapted to engage with the hole 5a of the through tongue 5.

Next the mode of operation of the safety seat belt system with the above construction will be described. In the occupant restrain position shown in FIG. 1, the belt 4 provides the three-point safety seat belt with the shoulder belt section 4a and the lap belt section 4b securely restraining the shoulder and lap of the occupant. In case of an accident or collision, the first and second retractors 6 and 2 securely lock the belt 4 and the inner belt 3, respectively. In addition, since the inner belt 3 is made of a material having a high tensile strength but a very small elongation percentage; the safety seat belt can positively and securely restrain the occupant so that the secondary collision of the occupant in the compartment can be prevented.

When the occupant wishes to get out of the vehicle, he may be immediately released from the belt restrain simply by gripping the through tongue 5 and engaging its hole 5a with the hook member 8. In this case, the inner belt 3 is extended out of the second retractor 2 while the shoulder belt section 4a of the belt 4 is extended out of the first retractor 6 along the inner side edge of the roof as shown in FIG. 2 while the lap belt section 4b is extended across the door slantingly upwardly from the anchor member 7 toward the hook member 8. When the door is opened as shown in FIG. 2, the occupant can get out of the vehicle without being restrained from the safety belt.

When the occupant gets into the vehicle with the safety seat belt in the position shown in FIG. 2, the inner belt extending from the second retractor 2 toward the hook member 8 across the front seat 1 blinds the occupant's view. Therefore the occupant has to release the through tongue 5 from the hook member 8. Then the inner belt 3 is rewound by the second retractor 2 while the belt 4, by the first retractor 6 so that the three-point safety belt restrains the occupant as shown in FIG. 1. As described above, even if the occupant tries to drive the vehicle without using the safety seat belt, the inner belt 3 blinds the occupant's front view so that he is obliged to use the safety seat belt. That is, whenever the occupant gets into the vehicle, the safety seat belt restrains him by one-touch operation.

It is to be understood that the present invention is not limited to the preferred embodiment described above. For instance, the inner belt 3 has been described as being made of a material having a high tensile strength but a very small elongation percentage, but it will be understood that it may be made of a unidirectionally oriented resilient spring steel strip bow-shaped in cross section which is used as a webbing, a helical or coiled spring or a convex measure tape. When the inner belt 3 is made of a spring steel strip, the winding force of the second retractor 2 is increased so that a weaker spring may be used or the spring may be eliminated, and the positive rewinding of the inner belt 3 is ensured. Same is true for the first retractor 6. More particularly, the section of the shoulder belt section 4a which is wound by and unwound from the first retractor 6 may be made of a spring steel strip as with the case of the inner belt 3.

The first and second retractors have been described as locking the belts only in case of an accident, but the retractor of the type which normally locks the belt and permits the unwinding of the belt only when the belt is released from the occupant may be used. Furthermore instead of the hook member 8, a sun visor may be used to hook the through tongue 5. Instead of the through tongue 5, the inner belt 3 may be so arranged as to be engageable with the hook member 8.

When it is difficult to attach the first retractor 6 to the upper side portion of the compartment, it may be attached or anchored to the floor with a suitable belt supporting means such as a slip joint attached to the upper side portion of the compartment.

As described above, the first invention provides a safety belt system comprising a belt having its one end securely fixed to the door adjacent the free swinging edge thereof and the other end securely fixed to a first retractor so as to be retracted therein and extended therefrom, a hook member securely attached to the upper portion of a pillar in the compartment, a through tongue through which is slidably inserted said belt, and an inner belt having one end securely fixed to said through tongue and the other end to a second retractor anchored to a lower inboard portion in the compartment, said through tongue or said inner belt being engaged with said hook member when an occupant gets into or out of the vehicle. Therefore the first invention offers a very excellent advantage in that the safety belt may be fastened or released by a simple "one-touch" operation of the through tongue. Another advantage is that the occupant is obliged to fasten the safety belt once he sits on the seat. A further excellent advantage is that in case of an accident the reliable performance of the safety belt is ensured without the sacrifice of the occupant restraining ability.

According to the second invention, the inner belt is made of a material having a high tensile strength but a very small elongation percentage. Therefore, the second retractor may be made very compact in size. In case of a collision, the movement of the occupant may be reduced to the minimum so that a secondary collision in the compartment may be prevented.

According to the third invention, the inner belt is made of a leaf spring material so that it exhibits the self-winding ability due to its elasticity and consequently adds the additional winding force to the second retractor. As a result, the load exerted on the spring of the second retractor may be reduced or the spring may be eliminated and the inner belt can be retracted into the second retractor in a more satisfactory manner.

What is claimed is:

1. A safety seat belt system for a seat in the passenger compartment of an automotive vehicle comprising:
    (a) a belt having one end securely anchored to a door of a vehicle at a portion adjacent to the free swinging side edge of said door and the other end securely fixed to a first retractor, said first retractor being mounted in said compartment at an upper portion thereof on the side of said door;
    (b) a through tongue through which is slidably inserted said belt, said through tongue having a hook engaging member;
    (c) an inner belt having one end securely fixed to said through tongue and the other end securely fixed to a second retractor anchored to a lower inboard portion of said compartment;
    (d) a hook member securely anchored to an upper portion of a pillar in said compartment forwardly of said first retractor such that, when said through tongue is suspended from said hook member on said hook engaging member, the visibility of an occupant of the seat is substantially obstructed by said inner belt.

2. A safety seat belt system as set forth in claim 1, wherein said inner belt is made of a material having a high tensile strength but a very small elongation percentage.

3. A safety seat belt system as set forth in claim 1, wherein said inner belt is made of a leaf spring material capable of exhibiting the self-winding force due to its elasticity.

* * * * *